No. 895,204. PATENTED AUG. 4, 1908.
K. RUSHTON.
REAR SWING TRUCK FOR LOCOMOTIVES.
APPLICATION FILED JUNE 1, 1906.
2 SHEETS—SHEET 1.
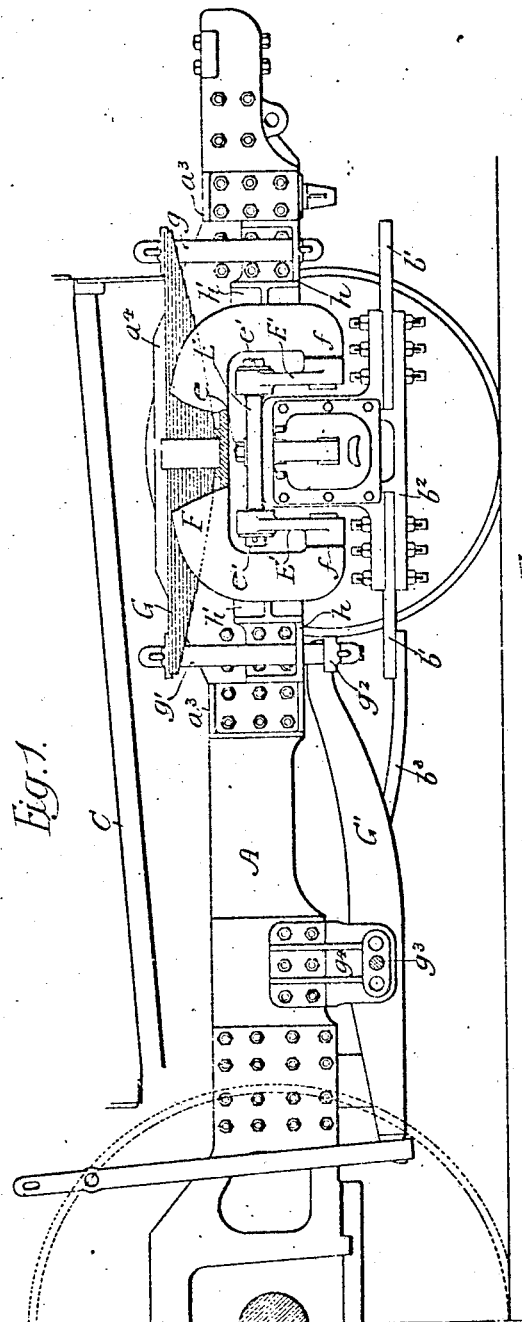
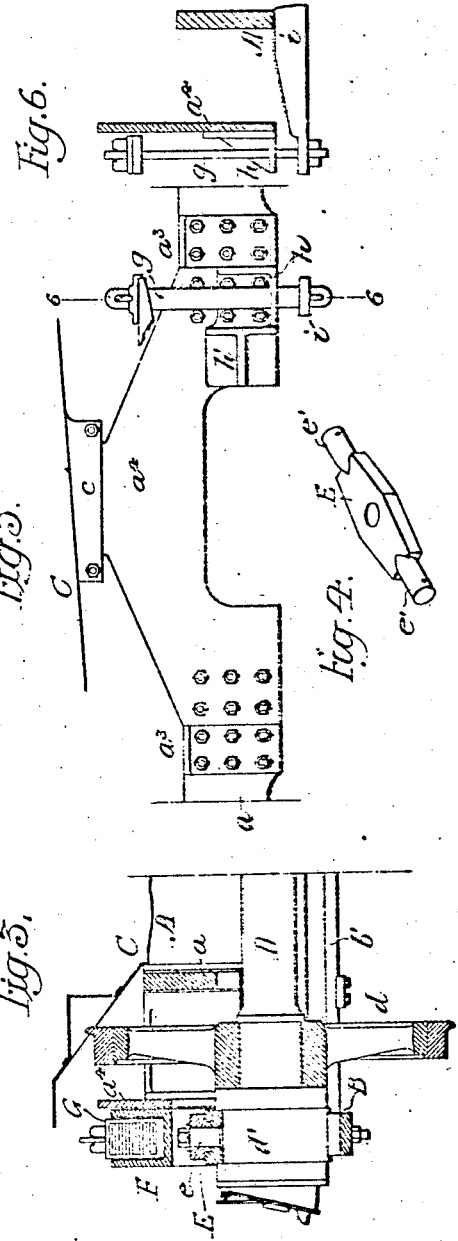
Witnesses:
Inventor
Kenneth Rushton.
by his Attorneys.

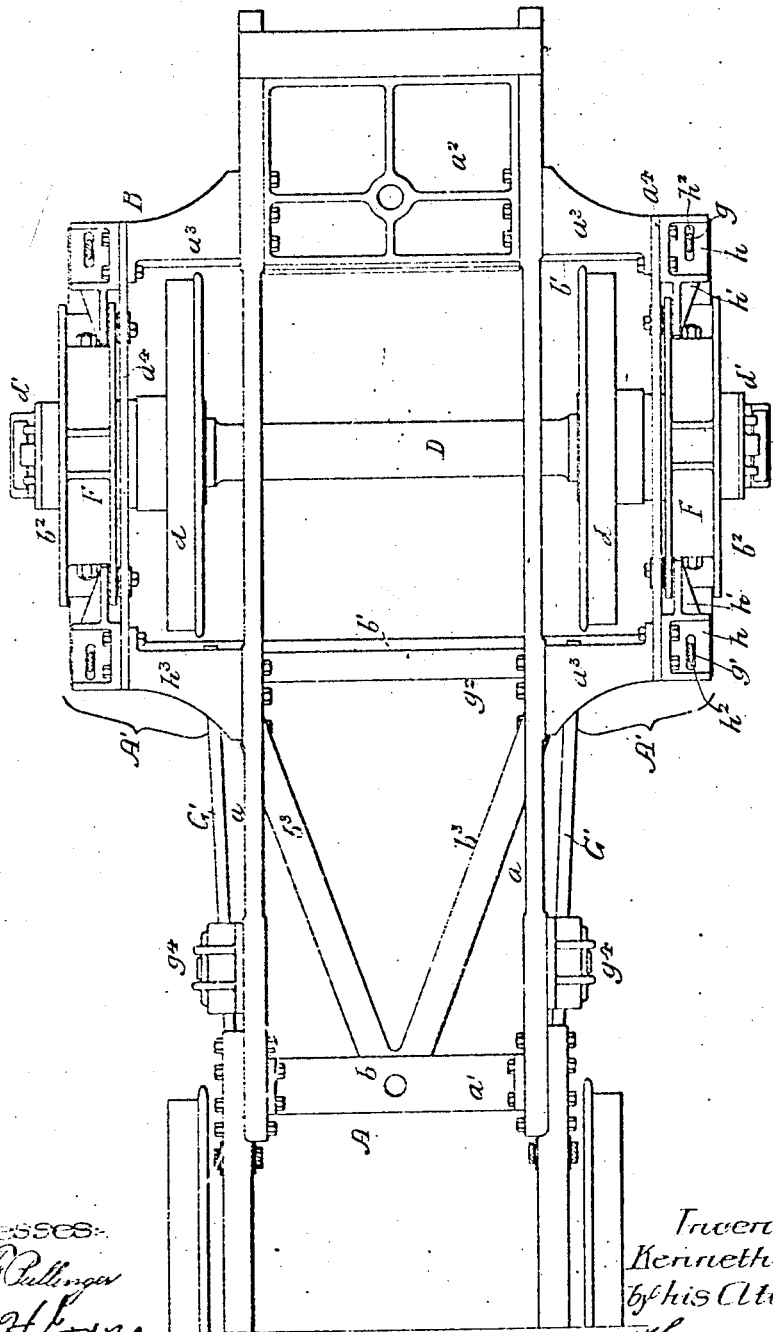

UNITED STATES PATENT OFFICE.

KENNETH RUSHTON, OF PHILADELPHIA, PENNSYLVANIA, ASSIGNOR TO BURNHAM, WILLIAMS & COMPANY, OF PHILADELPHIA, PENNSYLVANIA, A FIRM.

REAR SWING-TRUCK FOR LOCOMOTIVES.

No. 895,204.  Specification of Letters Patent.  Patented Aug. 4, 1908.

Application filed June 1, 1906. Serial No. 319,797.

*To all whom it may concern:*

Be it known that I, KENNETH RUSHTON, a citizen of the United States, residing in Philadelphia, Pennsylvania, have invented certain Improvements in Rear Swing-Trucks for Locomotives, of which the following is a specification.

My invention relates to certain improvements in locomotives of the type having rear swing trucks.

The object of my invention is to so design the truck that the mechanism will be outside of the wheels, leaving the central portion of the truck clear for the ash pit of the locomotive. This object I attain in the following manner, reference being had to the accompanying drawings, in which:—

Figure 1, is a side view of sufficient of the frame of a locomotive to illustrate my improved swing truck; Fig. 2, is a plan view with the equalizing springs removed; Fig. 3, is a sectional view on the line 3—3, Fig. 1; Fig. 4, is a detached perspective view of the pivoted bar; Fig. 5, is a view showing the outer frame of the truck acting as a support for the overhanging fire box; and Fig. 6, is a sectional view on the line 6—6, Fig. 5.

A is the main frame of the locomotive, the rear portion of this frame extends under the overhanging fire box C and consists of two side members $a$, $a$ and a cross member $a'$ and an end member $a^2$ on which is the foot plate and the coupling.

B is the swing frame pivoted at $b$ to the cross member $a'$ of the main frame, the truck having transverse members $b'$, $b'$, end members $b^2$, $b^2$, and a V-shaped bar extending from the pivot $b$ to each side of one of the transverse members $b'$, so that the truck swings on the pivot $b$ as it takes the curves.

D is the axle having flanged wheels $d$, $d$ and each end of this axle is mounted in a fixed box $d'$, Fig. 3, in the end frame $b^2$.

A', A' are side frames projecting from the main frame A and each frame consists of brackets $a^3$, $a^3$ and a cross plate $a^4$ arranged on edge. This cross plate $a^4$ may be clear of the overhanging fire box of the boiler C, or may act as a support for it, as shown in Fig. 5. The fire box having a bearing $c$ resting on the extended portion of the frame A' in this instance.

Mounted on the end frame $b^2$ of the truck B above the box $d'$ is a bar E, Fig. 4, having an opening for a pivot pin $e$ which projects from the frame $b^2$, Fig. 3. The bar has a central hub which enters a recess in the top of the frame $b^2$ so as to relieve the pin $e$. On each end of the pivoted bar E is a trunnion $e'$, these trunnions are connected by links E', E' to trunnions $f$, $f$ on a yoke F which extends over the end frame $b^2$. This yoke is U-shaped in cross section, having two deep side flanges forming a pocket for the elliptical spring G, which is seated as shown in Fig. 1.

In order to keep each yoke F in line with its side frame A', I secure brackets $h$, $h$ to the side frame, these brackets have fingers $h'$ which project alongside of the inner flange of the yoke F leaving a narrow channel between it and the frame for the flange to work in. The brackets also have holes $h^2$ for the passage of the rods $g$, $g'$ which are coupled to the spring G, the rod $g$ in the present instance is secured to the rear bracket $h$ but may be coupled to a cross bar $i$ forming a continuation of the equalizing gear, the bar bearing against the main frame A as shown in Fig. 6. By this construction the brackets $h$ are relieved from all strain, the brackets acting simply as guides. That portion of the equalizing gear at the rear truck is mounted outside of the main frame.

The rod $g'$ is connected to a cross bar $g^2$. Levers G' pivoted at $g^3$ to brackets $g^4$ on the frame A have arms which rest upon the cross bar, the other arms are connected with the equalizing gear of the main frame of the engine. This equalizing gear may be modified without departing from my invention.

The truck B is free to swing on its pivot $b$ when the locomotive is rounding a curve, the links E' allowing a certain lateral movement to the truck independent of the yokes F and the pivoted bars E will accommodate themselves to the position of the truck, thus avoiding all unnecessary strains.

By the above construction it will be seen that all the mechanism is outside of the main frame and in fact is outside of the wheels, so that increased space is secured for the ash pit which has been cramped on this type of locomotive, and without interfering with the swinging of the truck.

I claim:—

1. The combination in a locomotive of a frame, a swinging truck pivoted thereto, an axle, wheels therefor, bearings for the axle mounted on the truck outside of the wheels, yokes, links connecting the yokes to the truck, and springs carried by the yokes, said links, springs and yokes being all outside of the wheels so as to leave clear the center part of the truck and the main frame.

2. The combination of a main frame, a swing truck pivoted thereto, bars pivoted to the truck, yokes, and links connecting the yokes to the pivoted bars.

3. The combination of the main frame of a locomotive, side frames secured thereto, a swing truck pivoted to the main frame, bars pivoted to the truck, yokes held in position by the side frames, links connecting the yokes to the pivoted bars, and equalizing means mounted on the yokes.

4. The combination of the main frame of a locomotive, side frames secured thereto, a rear swing truck pivoted to the main frame, boxes on the truck, an axle mounted in the boxes, a bar pivoted to each side of the truck above the box, a yoke above each box, links connecting the bars to the yokes, brackets on the side frame having fingers for retaining the yokes in position, and equalizing means resting on the yokes.

5. The combination of the main frame of a locomotive, side frames secured thereto, a rear swing truck pivoted to the main frame, boxes on the truck, an axle mounted in the boxes, a bar pivoted to each side of the truck above the box, a yoke above each box, links connecting the bars to the yokes, brackets on the side frame having fingers for retaining the yokes in position, a spring mounted on each yoke, and rods connected to the spring and passing through holes in the brackets.

6. The combination of the main frame of a locomotive, a rear swing truck pivoted thereto, side frames secured to the main frame above the truck, each side frame consisting of two brackets and a cross plate, yokes held in position on the outside of the cross plates, and links connecting the yokes with the truck.

In testimony whereof, I have signed my name to this specification, in the presence of two subscribing witnesses.

KENNETH RUSHTON.

Witnesses:
C. LINSLEY,
E. J. ABBOTT.